(12) United States Patent
Ryan

(10) Patent No.: US 6,470,319 B1
(45) Date of Patent: Oct. 22, 2002

(54) DATA PROCESSING SYSTEM FOR DETERMINING CASE MANAGEMENT PLAN FOR CRIMINAL OFFENDER

(75) Inventor: Shannon P. Ryan, Cedar Rapids, IA (US)

(73) Assignee: Community Corrections Improvement Association, Cedar Rapids, IA (US)

( * ) Notice: Subject to any disclaimer, the term of this patent is extended or adjusted under 35 U.S.C. 154(b) by 0 days.

(21) Appl. No.: 09/344,815

(22) Filed: Jun. 25, 1999

(51) Int. Cl.[7] ............................................. G06F 17/60
(52) U.S. Cl. ............................... 705/1; 707/7; 707/100
(58) Field of Search ........................... 705/1–3; 707/7, 707/100

(56) References Cited

U.S. PATENT DOCUMENTS

| | | | | |
|---|---|---|---|---|
| 5,572,421 A | * | 11/1996 | Altman et al. | 395/203 |
| 5,842,175 A | * | 11/1998 | Andros et al. | 705/3 |
| 6,108,665 A | * | 8/2000 | Bair et al. | 707/104 |

FOREIGN PATENT DOCUMENTS

| | | | | |
|---|---|---|---|---|
| WO | WO 95/32480 | * | 11/1995 | G06F/19/00 |

OTHER PUBLICATIONS

"Iowa Department of Corrections Assessment of Client Risk", Iowa Department of Corrections Division of Community Services, Capitol Annex, 523 East 12th Street, Des Moines, IA 50319.

"Iowa Department of Corrections Reassessment of Client Risk", Iowa Department of Corrections, Division of Community Services, Capitol Annex, 523 East 12th Street, Des Moines, IA 50319.

"Strategies for Case Supervision Assessment Instrument", Iowa Department of Corrections, Division of Community Services, Capitol Annex, 523 East 12th Street, Des Moines, IA 50319.

"LSI–R Interview Guide–Community Based", Multi–Health Systems, Inc., 908 Niagara Falls Boulevard, North Tonawanda, NY 14120–2060.

"LSI–R Quick Scoring Review", Multi–Heath Systems, Inc., 908 Niagara Falls Boulevard, North Tonawanda, NY 14120–2060.

"LSI–R Full Scoring Review", Multi–Health Systems, Inc., 908 Niagara Falls Boulevard, North Tonawanda, NY 14120–2060, (800) 456–3003.

"LSI–R: Thr Level of Service Inventory—Revised", Andrews, D.A., Ph.D., and Bonta, James L., Ph.D., Multi–Health Systems, Inc., 908 Niagara Falls Boulevard, North Tonawanda, NY 14120–2060, (800) 456–3003.

* cited by examiner

Primary Examiner—James P. Trammell
Assistant Examiner—Jalatee Worjloh
(74) Attorney, Agent, or Firm—Allan L. Harms

(57) ABSTRACT

A data processing system for synthesizing data relating to a population of criminal offenders which displays for a selected offender a graphical result recommending a level of control and a level of treatment to be utilized to supervise the offender. The data processing system also provides links to bibliographic information related to methods and approaches to supervision of offenders. The data processing system can be accessed remotely by use of web browser software connected to an internet or intranet coupled to the data processing system. The data processing system may be used by court officers and community based correction personnel in responding in a systematic and consistent manner to behavioral events or personality deficiencies of the supervised offenders.

19 Claims, 13 Drawing Sheets

FIGURE 8

DATA PROCESSING SYSTEM FOR DETERMINING CASE MANAGEMENT PLAN FOR CRIMINAL OFFENDER

BACKGROUND OF THE INVENTION

The recognition of the efficiency and benefits of community-based corrections is increasing, leading to the placement of a wider range of offenders with community-based supervisory agencies. In the supervision of original offenders during probation and parole periods, it is necessary for a supervising officer to establish a plan to control the behavior and activities of the offenders and to treat the offender's undesirable behavioral traits, social and medical problems, and negative personal characteristics. Such plans are developed from experience and from the use of well-known assessment tools which collect factors identifying characteristics of behavior and personality of the offender to be supervised. Commonly used assessment tools for this purpose are the Level of Services Inventory—Revised (LSI-R), the Client Management Classification system (CMC), The American Society of Addictive Medicine criteria (ASAM), the Brown Attention Deficit Disorder Scale and the Iowa Classification System. The supervising officer must employ these tools to try to establish a maximally effective treatment and control plan for the offender in order to assist the offender to return to the general population as a law-abiding individual.

In current practice, a supervising officer obtains and reviews the assessment tool results for the particular offender and then tries to mentally arrange the assessment scores to choose among levels of treatment intensity and levels of control intensity to be employed with the individual offender. This is a time-consuming and difficult project and also permits inconsistent supervision plans among offenders with similar assessment scores. Existing methods may result in excessive treatment or control of the offender resulting in a lack of responsivity and a waste of supervisory agency resources. Consequently, an offender may be provided insufficient control for community safety and inadequate treatment for individual improvement.

SUMMARY OF THE INVENTION

The present invention provides a data processing system and method for entering a multiplicity of demographic, behavioral, personality, and life skills factors for a group of offenders to be supervised which factors can then be sorted into sets corresponding to each of the individual offenders. The sets of factors can then be weighted and composite scores for control level and for treatment level can be computed. The control level score and the treatment level score may be arranged in a grid of sixteen cells which are identified by two factors: level of treatment and level of control, with each cell corresponding to one of four levels of control (low, moderate, elevated, and high) and to one of four levels of treatment (low, moderate, elevated, and high). Hence a first cell is characterized as low control-low treatment, while the diagonally opposing cell in the grid is characterized as high control-high treatment. The remaining fourteen cells are arranged according to the set of control and treatment levels remaining such that control level is arranged on a first axis and treatment level is arranged on the orthogonal axis to the first axis of the grid. For a given offender, the factors used in determining the control score and the treatment score for that offender are used to predict the level of control and level of treatment which will be effective in supervision of that offender. The predicted level of control and the predicted level of treatment are displayed in the grid of possible levels and the cell corresponding to the two levels is highlighted by differing screen intensity or color or by other similar indicating means. The supervising officer then may examine the grid of possible treatment and control levels and quickly identify the combination of treatment level and control levels which is recommended for the particular offender based on the assessment tools and other evaluative factors employed.

The invention also provides a set of descriptive information which may be reviewed from the display of the grid which relates to the specific offender and that offender's individual assessment factors and which also provides a speedy reference to useful information about the factors and the assessment tools which have been employed in determining the factors related to the particular offender. The invention provides efficient links to displays of appropriate supervisory responses when dealing with the offender and provides schedules of responses for each of the sixteen combinations of control level and treatment level available for guidance.

The present invention is embodied in software which was designed to match the supervised criminal offender with treatment resources and to afford consistent planning for offenders of like charcteristics. The invention provides a systematic approach to assessing the risk and needs of offenders and matching them with the treatment resources and the supervision strategies that the local community correction agency has available. The invention can also identify offenders who are high-risk limit setters and those who may have gang ties or other antisocial characteristics as described by Bonta et al.

The invention system is based on internet and intranet technologies, linking the user quickly to selective parts of the data outputs as randomly selected by the user. The preferred embodiment employs the following application and system software: Microsoft® Internet Explorer web browser, Microsoft® SQL Server™ database engine, Allaire™ ColdFusion™ web application server software, Microsoft® IIS™ internet information server, and Microsoft® Windows NT™ network operating system software.

The invention receives assessment factors from such assessment tools as the Level of Services Inventory—Revised (LSI-R) (for measuring risk of criminal behavior and need for treatment), Client Management Classification instrument (CMC) (for case plan development), American Society of Addictive Medicine criteria (ASAM) (for measurement of substance abuse treatment needs), the Brown Attention-Deficit Disorder Scale, the Iowa Classification System (ICS) (for evaluation of risk of continued criminal activity), and the Hare Psychopathy Checklist. The invention synthesizes the information, and uses it to plot a position on a sixteen-grid matrix.

The primary display of the invention consists of two axes; risk (control) and need (treatment). The invention operates on the principle that to supervise offenders, one must assess both risk and need and use that information in developing a supervision and treatment strategy. The invention breaks the client population into four major groups, then into sixteen subgroups. Each subgroup has specific control and treatment options which staff may choose depending on the offender's case management history and available resources. The invention is fluid in its graphical display of the appropriate risk and need scores depending on an offender's response to supervision. Generally recategorization occurs after successful completion of programming or in response to violative behavior. Using the computer's mouse "to pop the screen open" the supervising agent finds the supervision and treatment strategies available to work with a particular offender. Radio buttons on the left side of the computer screen link to additional information such as suggested responses to violating behaviors, thresholds, examples of similar offender behaviors, the set of assessment factors related to the offender, and possible sanctions. Displayed on the right side of the screen are common definitions of terms and a bibliography of research material which may be reviewed. For example, an agent exploring the use of the LSI-R could check the bibliography and find the "big four" factors pertaining to antisocial issues in Bonta's work.

The invention provides the offender's supervisor with options for treatment and supervision and automatically displays the aggregate success rate for those options when previously used by other supervising staff of the local community corrections agency. Additionally the invention allows the development of protocol and policy to provide the best practice for managing scarce resources. For example, in addition to a "continuum of sanctions" the invention also suggests a "continuum of treatment". The subtle benefit of developing a protocol for a continuum of treatment is that staff is not always being required to "ratchet up" responses for an offender's failure to comply. The invention also allows the agency to establish response thresholds and to establish appropriate responses for all violating behaviors.

A supervising agent may review the assessment scores that triggered the placement of a particular offender by selecting the appropriate radio button to cause display of the assessment scores for that offender. By entering specific data about an offender, including demographics, assessment results, criminal history, and supervision status, the invention will synthesize the information and provide users with a range of case management interventions consistent with an offender's risk level and criminogenic needs (or dynamic risk factors). By evaluating information unique to the individual offender, the invention assists the supervisor in case programming which is targeted and matched to the offender profile, thereby maintaining the principle of responsivity.

The invention is designed to interface with a database to provide outcomes on offender success rates, program effectiveness, client profiles, and other information.

The primary objective of the invention is to assist the supervising agent, the agent's supervisor, and court officers in selecting the most desirable intermediate sanction based on risk, need, and responsivity. It also helps select the least restrictive alternative to revocation, commensurate with community safety, deemed appropriate to control or change offender behavior.

It is also an object of the present invention to provide an efficient method to synthesize a collection of behavior, personality and skill factors of a parolee or probationee and to identify and quantify the level of control and treatment intensity which should be employed in supervision of the offender.

It is also an object of the present invention to provide a data processing system which can be employed by adult offender supervising agencies to obtain a graphic indication of the preferred level of control and treatment to be employed with a particular offender.

It is a further object of the present invention to provide a data processing system which can receive and store a number of assessment tool factors related to each of a number of individual offenders and which can sort, arrange and store the factors as sets of data corresponding to the individual offender, further allowing a supervising officer to display and print on paper the factors and supervision grid for the individual offender selected for evaluation and supervision.

Another object of the invention is to provide a data processing system which provides a supervisory tool which suggests consistent treatment over a range of criminal offenders and contextually links information for use by the supervising agent in dealing with the offender to be supervised.

It is further an object of the invention to provide a web based data processing system which enables remote users to access data about a population of offenders which is stored on a central storage medium.

DESCRIPTION OF THE DRAWING FIGURES

FIG. 1 is a block diagram representation of a data processing system for aiding supervision of a population of offenders by a corrections agent.

FIGS. 2A, 2B and 2C are a flow chart for software for entering offender demographic and assessment data, storing the data, synthesizing the data into useful information for categorizing the offender into levels of risk to reoffend and need for treatment with available resources and providing a graphical display of the offender's suggested placement along with linked information regarding the offender and supervision options.

FIG. 8 is a sample display of the particular set of assessment tool factors which have been entered in the data processing system related to a subject offender whose placement is being reviewed.

DETAILED DESCRIPTION OF THE INVENTION

Figure 1:
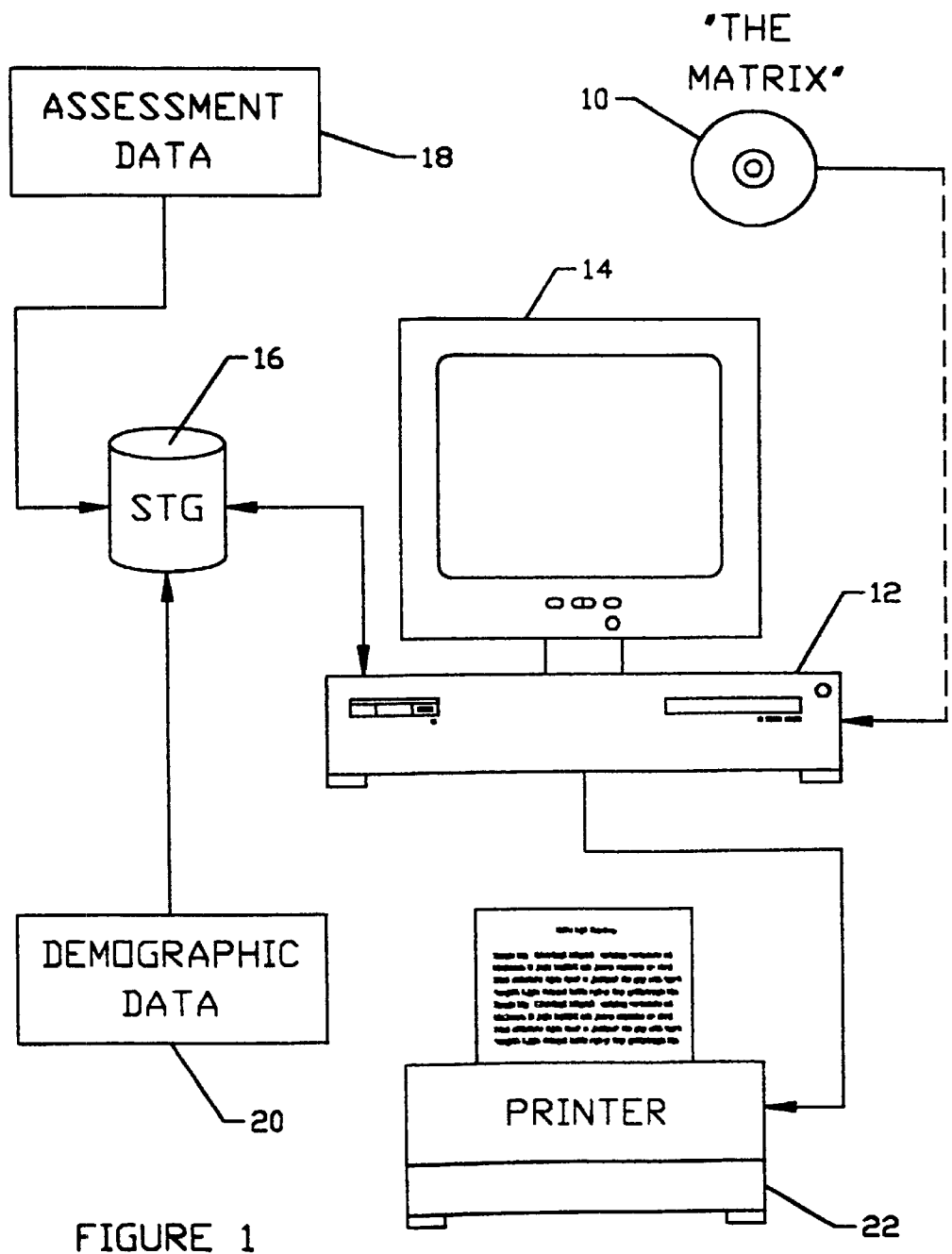

FIG. 1 illustrates a data processing system embodying the present invention wherein a data processing unit, namely a desktop or laptop computer 12 is associated with a display unit 14, preferably a CRT or flat panel display which receives signals from computer 12. Computer 12 is programmed with "THE MATRIX" software 10, owned by Community Corrections Improvement Association of Cedar Rapids, Iowa, which provides means to use computer 12 to process data and to display and print a graphical output of recommended supervisory activities regarding a supervised offender. Storage media 16 is coupled to computer 12 such that data stored on storage media 16 may be read and modified by computer 12 and new data generated by computer 12 may be written to storage media 16 for storage thereon. Printer 22 is coupled to computer 12 for selective generation of printed outputs from computer 12.

The invention system is based on internet and intranet technologies, linking the user quickly to selective parts of the data outputs as randomly selected by the user. The invention data processing system employs the following application and system software: web browser, database management software, web application server software, internet information server, and network operating system software.

Assessment data 18 comprises scores and raw data compiled from evaluation of criminal offenders who are supervised by staff of a correctional agency, preferably a community-based corrections agency exemplified by the Sixth Judicial District Department of Corrections located in Cedar Rapids, Iowa. Such assessment data may include factors developed from the use of assessment tools including Level of Services Inventory—Revised (LSI-R) (for measuring risk of criminal behavior and need for treatment), Client Management Classification instrument (CMC) (for case plan development), American Society of Addictive Medicine criteria (ASAM) (for measurement of substance abuse treatment needs), the Brown Attention-Deficit Disorder Scale, the Iowa Classification System (ICS) (for evaluation of risk of continued criminal activity), and the Hare Psychopathy Checklist.

Demographic data 20 may be entered by the user into computer 12 and stored on storage media 16 or such data may be received electronically by computer 12 from an external computer source. Demographic data 20 includes age, gender, employment, and other history of each of a group of offenders to be supervised by the corrections agency.

Also stored on storage media 16 as a part of the data processing system is a collection of treatment and supervision options along with descriptive data and bibliographies containing information to assist a supervising agent in carrying out effective supervision. Storage media 16 may also have previously been modified by inclusion of assessment data developed by use of the LSI-R assessment tool, whereby the LSI-R assessment factors may be stored in a database which may be accessed by the invention data processing system software 10. Storage media 16 may also have stored thereon other useful information, including lists of sanctions, profiles of offenders, threshold choices for treatments, available programs for treatments, prerequisites for scoring at specific need and risk levels, potential responses to employ, examples of offenders having similar control and treatment scores, all of which may be sorted and managed by database management software.

Software 10 causes computer 12 to integrate demographic data 20 with assessment data 18 such that a set of data corresponding to each individual offender is compiled and stored on storage media 16. The compiled data set is further manipulated by weighting of certain factors of the assessment data and the demographic data to calculate a risk score and a need score corresponding with each offender. The weighting methodology is stored on the storage media 16 and may be customized to local experience of the supervisory agency. The risk score and need score of each offender may be selectively displayed on display 14 in a graphical manner as one of sixteen cells arranged in a four-by-four grid. The risk score is translated into a level of risk from a selection of four levels of risk and the need score is translated into a level of need from a selection of four levels of need. Each of the sixteen cells of the displayed grid corresponds to one combination of a risk level and need level such that no two cells correspond to the same combination of risk level and need level.

The displayed resulting grid may be printed on printer 22, as may other informational matter which may be displayed on display 14. For example, a user may select display of background information such as the specific assessment and demographic data corresponding to the offender, or treatment options corresponding to the derived risk level and need level generated by the data processing system in synthesizing the data corresponding to the offender.

Figure 2A:
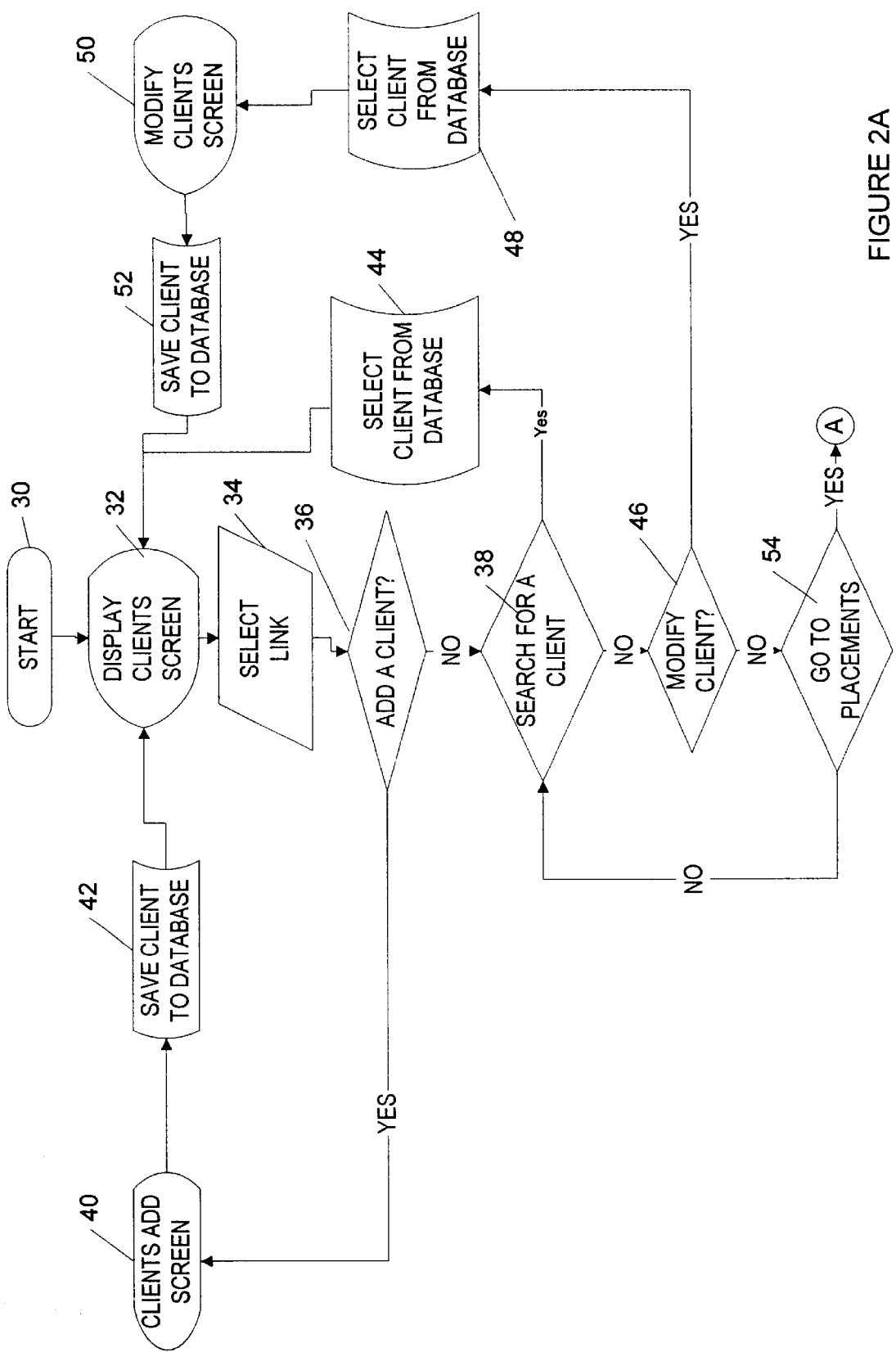
Figure 2B:
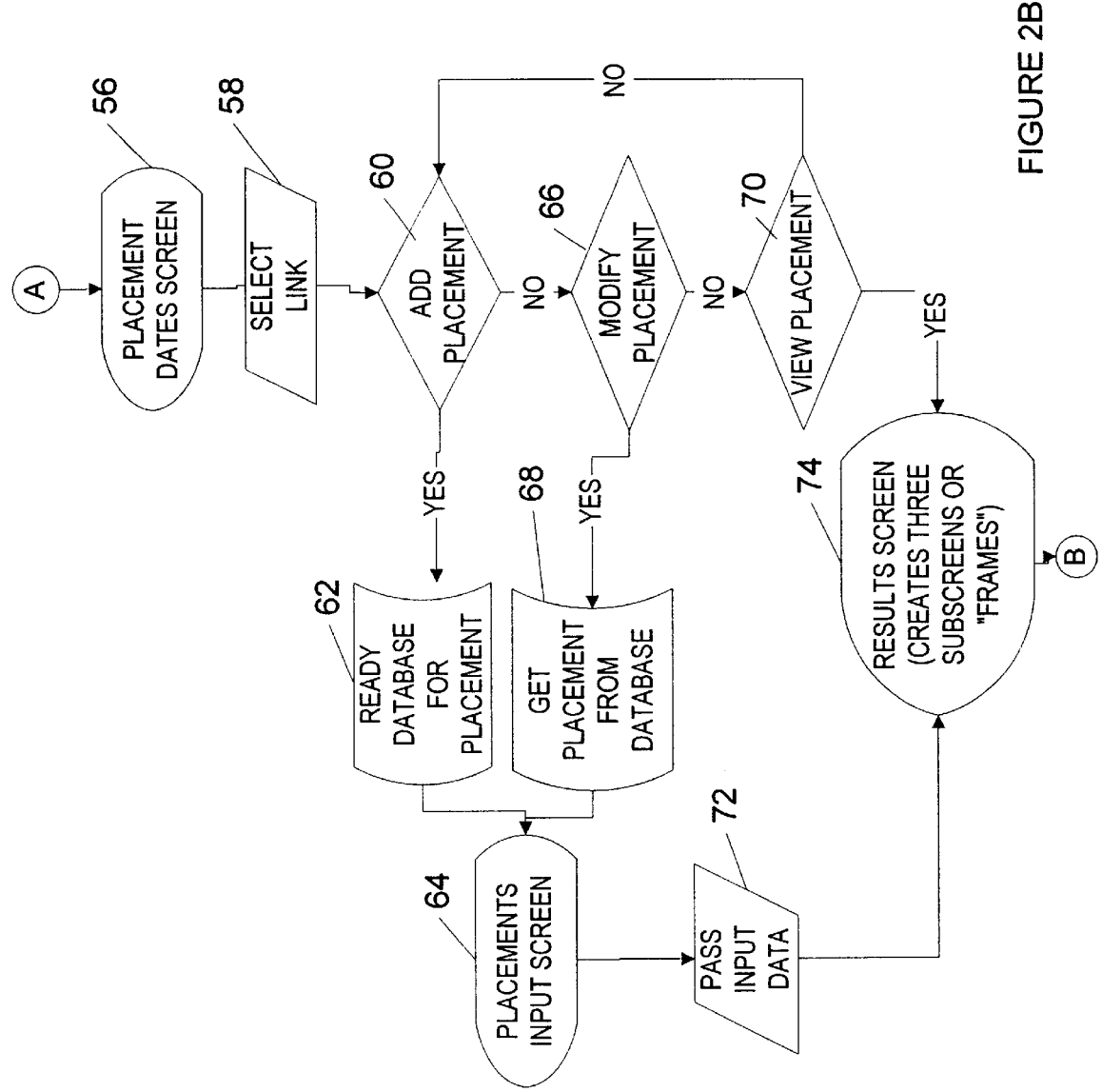
Figure 2C:
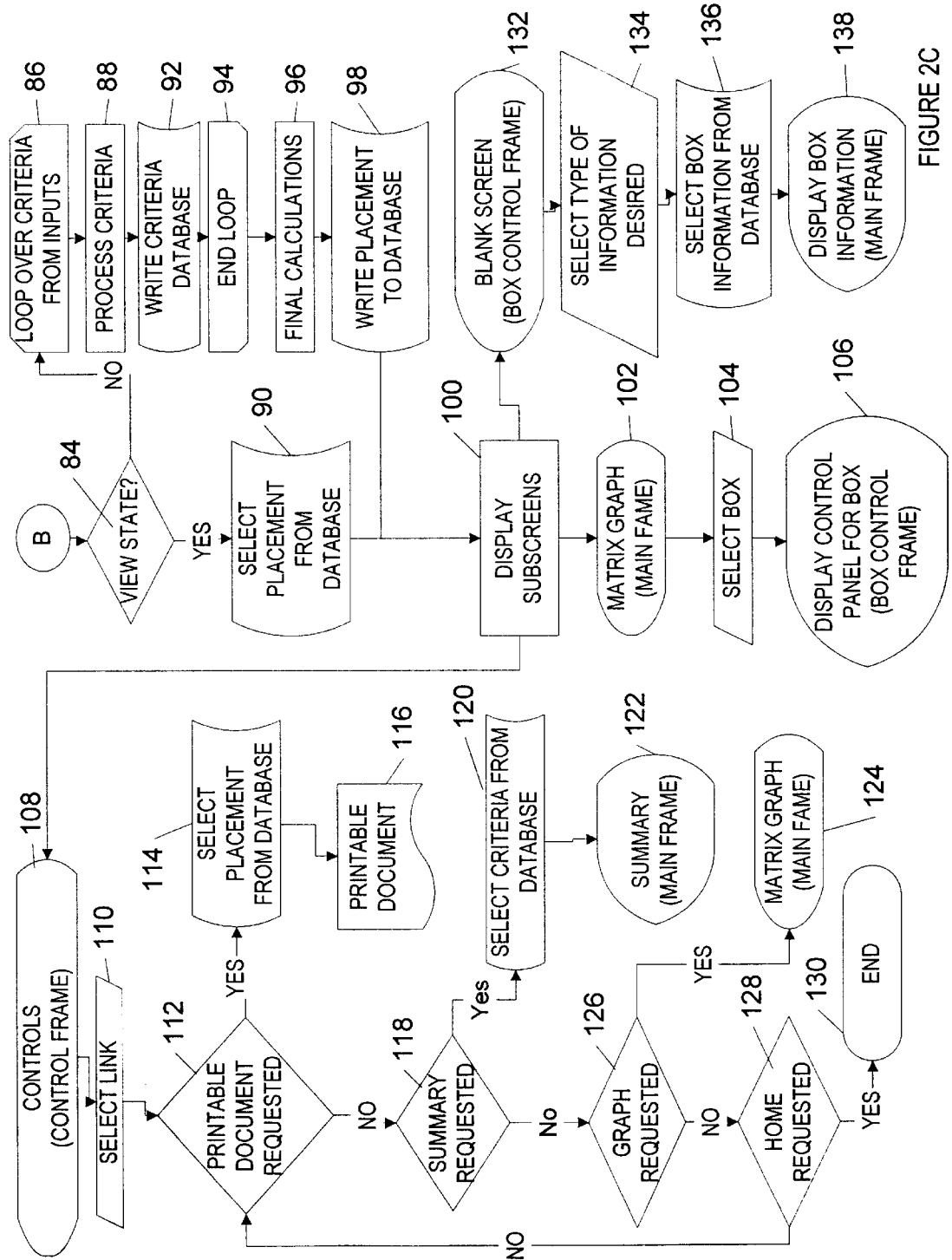
Figure 4:
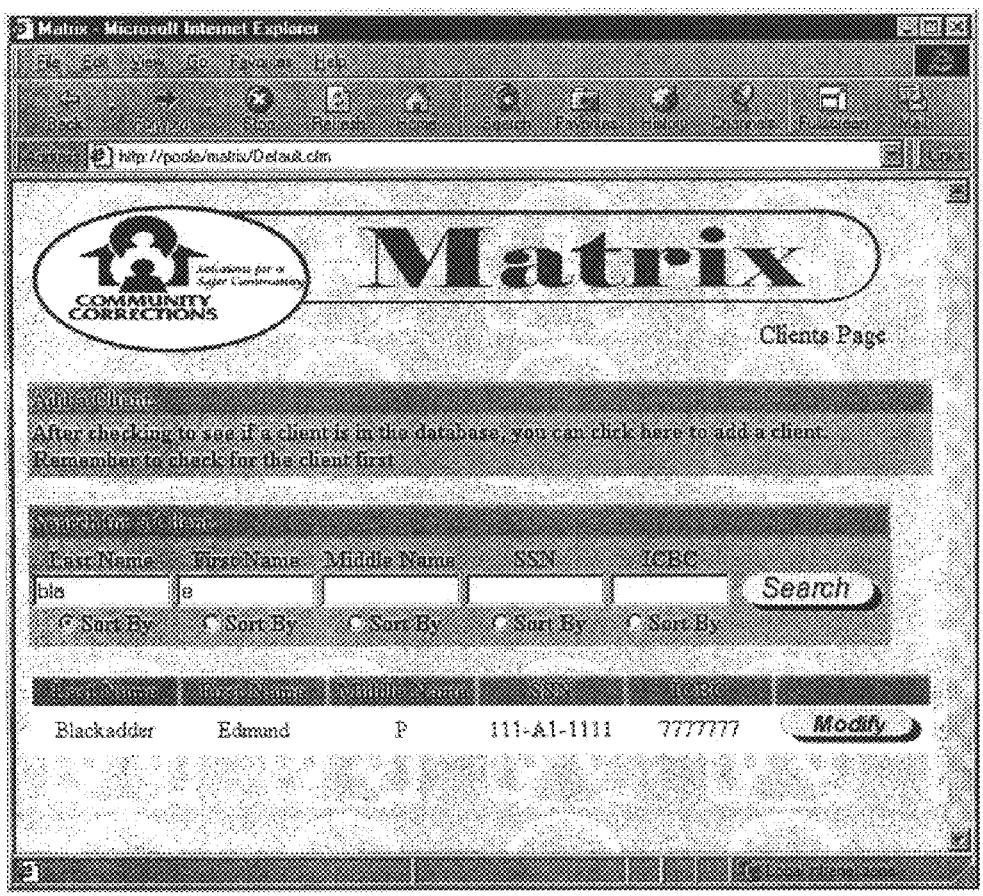
FIG. 4 is an exemplary display for the "Client Entry" stage of the data processing system of FIG. 1.

Referring now to FIGS. 2A–2B–2C, a flow chart of the operation of the invention is disclosed. Circle A of FIG. 2A marks the connection to the segment of the flow chart shown in FIG. 2B and is common to the circle A of FIG. 2B. Circle B of FIG. 2B marks the connection to the segment of the flow chart shown in FIG. 2C and is common to circle B of FIG. 2C. The first segment of the flow chart depicts the information flow through segments of software 10 which comprises the client management system of the invention wherein a starting point is represented by block 30 and leads to the Display Clients Screen block 32 at which the user, typically a supervising officer, is presented with a visual display of choices and chooses via the Select Link block 34 to add an offender (client) or to search for an offender by name. An exemplary display presented by the data processing system at block 32 is shown in FIG. 4. The software executes the choice of the user to add a client at block 36 or to search the stored database for an earlier entered client at block 38. If the user chooses to add an offender to the stored database, the offender's name, social security number, and other desired demographic data are added by keyboard entry or electronic data interchange in response to a displayed questionnaire created at block 40. The data processing system saves the added data to storage media 16 at block 42 after the user selects "Submit" displayed as a choice at block 40.

If the user has chosen to review the data for an existing client whose data has been previously stored on storage media 16, the user enters identifying information at block 32 such as the beginning characters of the client's last name, first name, middle name, social security number, or other demographic items and instructs the data processing system to sort the stored data by the selected item by selecting "Search" which causes the data processing system to execute a search of the stored database at block 38. The data processing system displays a list of clients who meet the search criteria entered at block 32 and the user may select a client from the list presented which causes the data processing system to retrieve the record corresponding to the specific client chosen from storage media 16 as indicated at block 44. The user may select to link to the placement data regarding the selected client at block 34 which causes the software 10 to instruct the data processing system to display the placement information at block 56 by executing the instructions at block 54.

If the user needs to modify the demographic data of an existing client's record, the selection of that choice at block 34 causes the execution of instructions at block 46 to retrieve the selected client's demographic information from storage media 16 at block 48 and to permit the user to modify the information at block 50 whereupon the data processing system saves the revised information to storage media 16 at block 52.

If the user is ready to enter assessment data for a new client, the data processing system executes instructions through blocks 36, 38, 46, and 54 to display placement options at block 56. At block 58, the user may select to add assessment data about the new client whose demographic data has earlier been entered. The data processing system executes instructions at block 60 stemming from the user inputs made at block 58 and readies the stored database for accepting new data at block 62. At block 64, the data processing system generates a display at which the user may enter various factors selected from available behavioral and personality information collected earlier from use of assessment tools, the results of which have been generated through earlier interviews of the offender and prior questionnaires answered by the offender. Specific history may be entered including e.g. whether the offender has engaged in battering behavior, if the offender was convicted of operating a motor vehicle while under the influence of alcohol or drugs, or whether the offender used a weapon in committing the offense. Certain results of the CMC assessment tool which have been selected for inclusion for all clients by the agency are entered at block 72, along with the overall assessment score from the CMC. Similarly the LSI-R assessment score is entered, along with scores derived from responses to certain of the questions of the LSI-R. Factors developed through use of the LSI-R assessment tool may have been earlier stored on storage media 16 to be held in a database which can be shared with software 10. If available, assessment measures from other offender assessment tools are added, including results of HARE, ASAM, Brown Index and the Iowa Classification System assessment.

Once the user has completed work on entry of new offender demographic information or modification of information about existing offenders, the user responds "yes" at "Go To Placements" block 54 which forwards the user to the placement dates screen block 56. When an offender's data is first being entered, Placement Dates Screen block 56 allows the user to select at block 58 to add new assessment data to the record of the offender whose data is being added to the database. After making the desired selection at block 58, the data processing system executes commands at block 60 for assessment data to be added. The software readies the database at block 62 and presents the user with the Placements Input Screen at block 64. After entry by keyboard or other means including electronic data transfer, the software 10 permits the user to approve the data at block 72.

Figure 6:
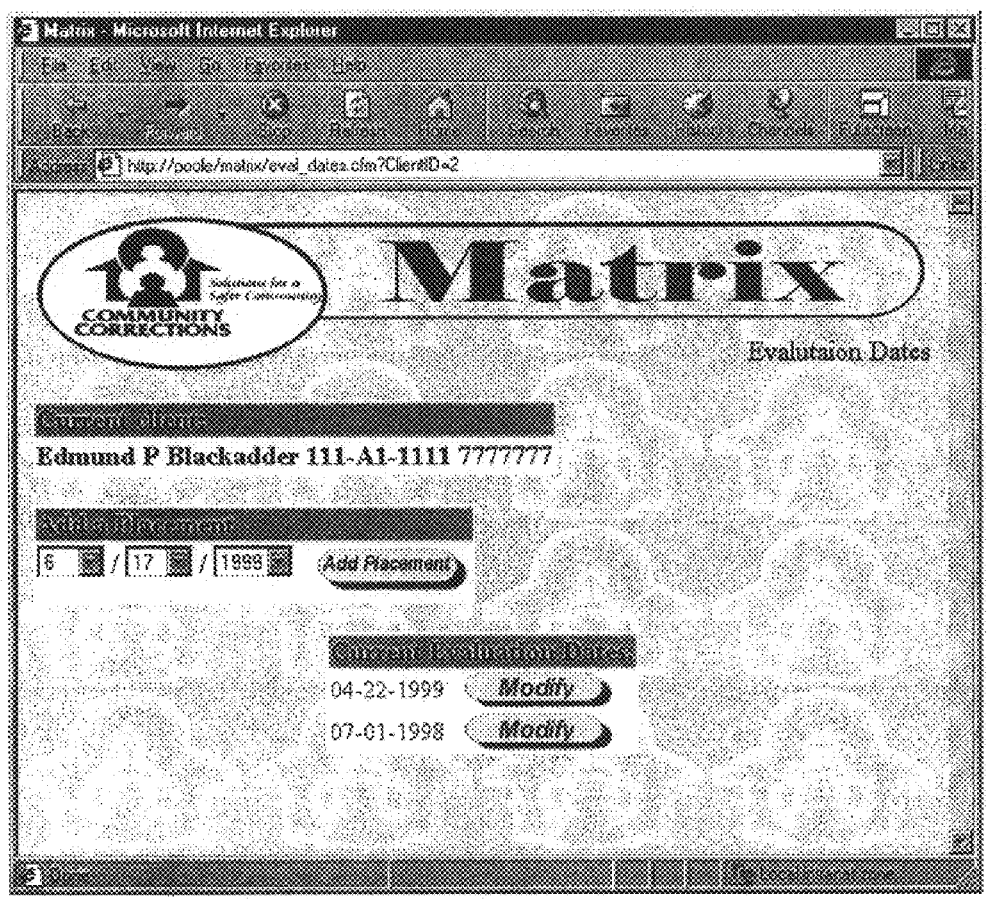
FIG. 6 is an exemplary display for the "Add Placement" stage of the data processing system.

When the user desires to review a case management plan previously recommended for an existing client, at block 56 the user is presented with a choice of information to review concerning the particular offender whose case is being considered. At block 58, the supervising user may select among dates at which changes to the offender's data have been entered. An exemplary display of the display of block 56 is shown in FIG. 6. For instance, the supervisor may review the offender's original placement while supervised by the agency by selecting the earliest date displayed at the placement dates screen at block 56. The supervisor may elect to enter a new placement plan. By pointing the computer's cursor or mouse pointer at a desired date from the displayed list, the supervisor chooses at block 58 a link to the history of treatment and control plans or the supervisor may select to enter an updated data set in the event, for instance, noncompliant behavior has occurred or certain treatment objectives have been achieved.

The software 10 executes the instructions for adding a new set of data at block 60, if the selection at block 58 has been to add a new placement. The software 10 readies the stored database for addition of a new placement or data set at block 62 and produces a "Placements Input Screen" display at block 64.

Figure 3:
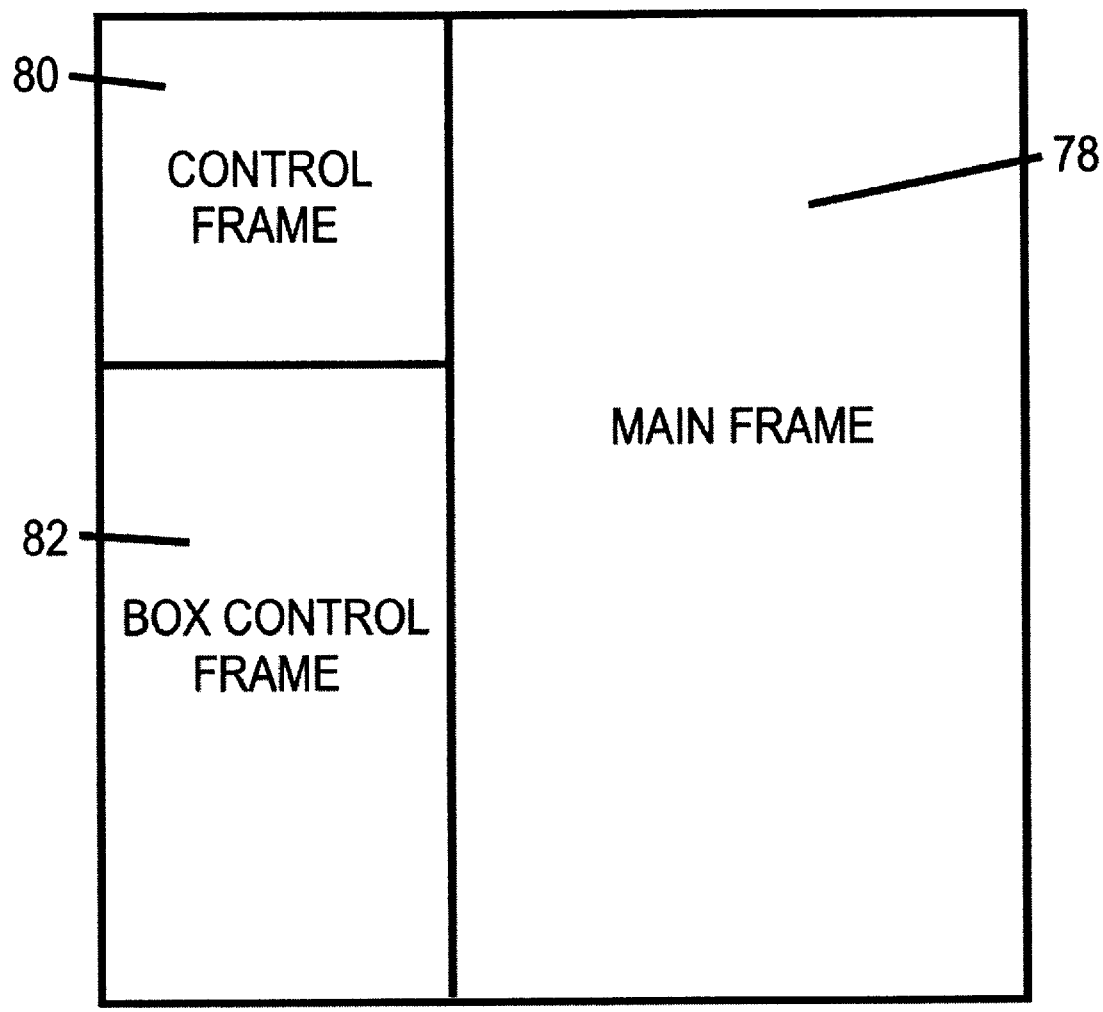
FIG. 3 is a diagram of a display divided into independent frames for display of results compiled by the data processing system of FIG. 1.

If the user has selected at block 58 to review an existing case management plan, also referred to as "a placement", the software 10 instructs the data processing system at block 60 to proceed to block 66 and to execute instructions to retrieve placement data from the storage media 16 at block 68. Having made new entries or changes to existing data sets at block 72, the software 10 instructs the data processing system at block 74 to produce a "Results Screen" display having three frames, each of which being separately scrollable at the user's selection. The three-frame display created at block 74 is in the form illustrated in FIG. 3 wherein a screen display which will be shown on display 14 comprises a main frame 78, a control frame 80 and a box control frame 82. Each of the frames 78, 80, 82 is a separately scrollable and independent visual display of the output resulting from the operation of software 10.

If the user has selected viewing an existing placement only, then instructions executed at block 70 instruct the data processing system to proceed to production of the "Results Screen" at block 74.

Following the creation of the three-frame display outline at block 74, the software determines whether a new placement must be developed at block 84. If a choice is made to view an existing placement stored on the database storage media 16, the selected placement information is retrieved from the database at block 90 and is displayed on the display 14 at block 100.

If a new placement plan is to be suggested by the software 10, the software reviews the previously entered assessment factors at block 86 and weights them at block 88 by using a look-up table stored on storage media 16 which is used to convert the assessment factors into numerical results. The raw assessment factors and the derived numerical results are saved to the database on the storage media 16 at block 92 and the software completes conversion of the raw assessment data at block 94 and moves to block 96 where a need score and a risk score are compiled from the numerical results generated at block 88. The resulting need score and the risk score are written to the database at block 98 as a summary placement plan and then forwarded to the computer's display function at block 100 at which the placement data consisting of the computed need score and risk score for the particular offender is displayed graphically in the main frame 78 at block 102. The results are displaced in a sixteen-cell matrix or grid, each of the sixteen cells corresponding to a different combination of control level and treatment level, there being four levels of each of control and treatment evaluations. Each cell is numbered and selection of a cell's number at block 104 links to a particular set of informational data which is provided at block 106 through a set of radio buttons which are displayed in box control frame 82.

Figure 5:
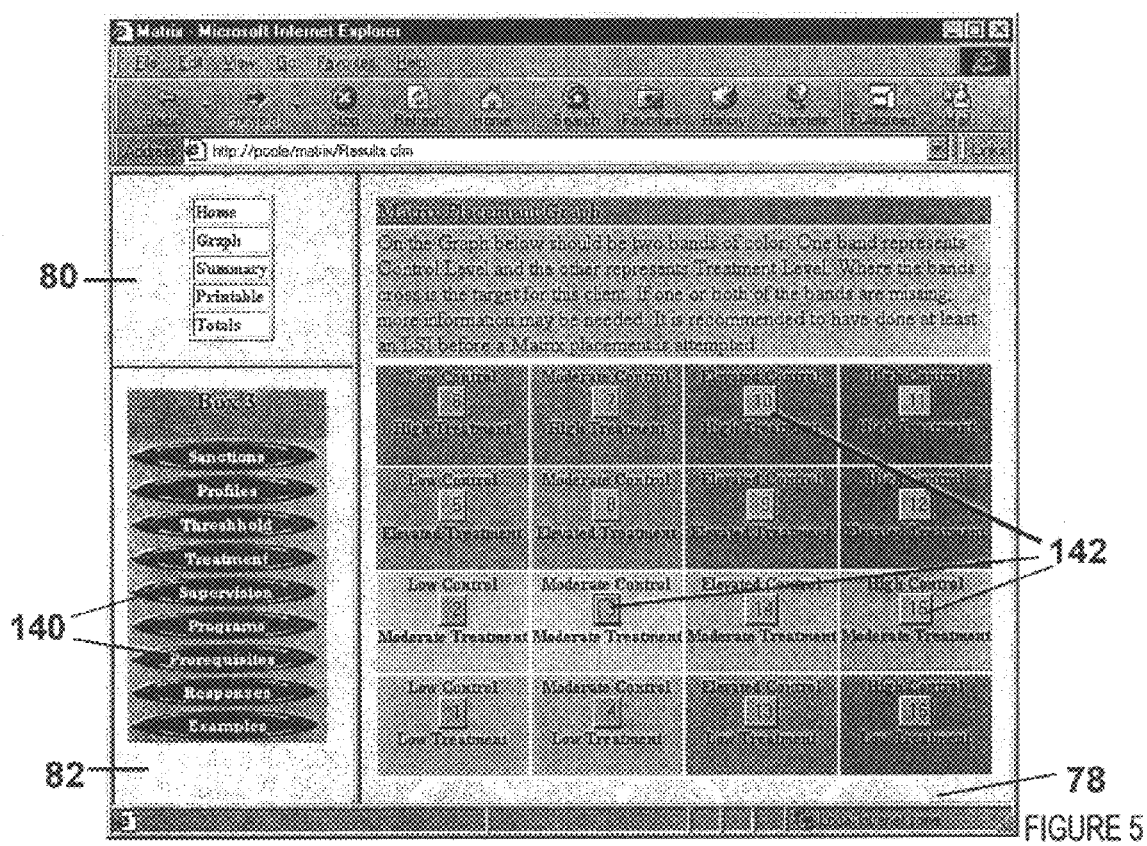
FIG. 5 is a sample display of information provided by the data processing system of FIG. 1 including a sixteen cell matrix of differing combinations of control level and treatment level into which an offender may be categorized.

An example of a grid which may be displayed in main frame 78 is shown in FIG. 5. As noted above, each cell represents a different combination of control level (low, moderate, elevated, or high) and of treatment level (low, moderate, elevated, or high). Control levels are displayed on horizontal axes while treatment levels are displayed on vertical axes in the preferred embodiment which creates the screen display shown in FIG. 5. The software 10, having computed the composite risk score and need score, interprets the need score to mark a row corresponding to the treatment level determined from the need score. The software 10 also interprets the risk score by marking a column of the grid corresponding to a control level corresponding with the calculated risk score for the offender in question.

The intersection of the marked row and marked column identifies a specific cell corresponding to the risk score and need score determined for the particular offender. The software emphasizes the intersection cell by display of the cell in bold print, or by emphatic colors, or increased screen brightness or by other well-known methods of drawing attention to a part of a visual display.

As seen in FIG. 5, number buttons 142 are shown on each of the cells. Initially, box control frame 82 is blank as at block 132. When a cell's number button 142 is selected with the computer's cursor at block 134, a set of "radio buttons" 140 appears in the box control frame 82. The radio buttons 140 are visual indicators which identify related topics and which when pointed to by the computer's cursor link to lists of information which are displayed in the main frame 78 which relate to the topic shown on the radio button selected. Selection of a radio button is indicated at block 136 and the display of the linked information at block 138.

The content of the topic lists is context sensitive, that is, the list of sanctions displayed when the "Sanctions" button 140 of FIG. 5 is selected is relevant to the level of treatment and control shown in the selected cell. For example, the list of available sanctions for an offender for whom moderate control and low treatment are indicated as categorized in cell 3 is different than the list of available sanctions when another cell is chosen. If cell 12 were chosen, that cell corresponding to high control and elevated treatment (that is, corresponding to a highest risk score and a second highest need score) the "sanction" button would link to display of a list of sanctions of greater severity than those displayed in reference to cell 3. As a result, the user is provided with a powerful tool to supervise the offender which graphically displays the need for treatment and the required level of control indicated by the weighted assessment data. The invention then provides the supervisor with references to other topics related to correctional supervision which are relevant to the status and needs of the offender being supervised.

In addition to a link to lists available sanctions, the radio buttons provide the following other relevant information within box control frame 82:

| RADIO BUTTON | LINKS TO |
| --- | --- |
| Profiles | A list of traits and characteristics of a typical offender with scores similar to the subject offender. |
| Threshold | A list of the most severe available and appropriate punishments for this type of offender. |
| Treatment | A list of the available treatment resources available for an offender with this level of need. |
| Supervision | A list of tactics and methods available to the supervising agent in controlling this type of offender. |
| Program | A list of available correction programs in which this offender may be enrolled. |

-continued

| RADIO BUTTON | LINKS TO |
| --- | --- |
| Prerequisites | A list of treatments which must have been tried before the suggested treatment is employed. |
| Responses | A list of available responses available to the supervising agency in dealing with this type of offender. |
| Examples | A list of responses which have been used previously to supervise this type of offender. |

Referring again to FIG. 2B, the display generated at block 100 also creates a display at block 108 in the control frame 80 (See FIG. 3) which lists links which the user may select at block 110 including the following:

| Home | Returns the user to the starting screen (at block 30 of FIG. 2A) through the software's instruction at block 128. |
| --- | --- |
| Graph | The default choice which displays the grid of sixteen cells in the main frame 78. |
| Summary | Causes display in main frame 78 of information showing the assessment factors which contribute to each of the four levels of risk and need computed by the data processing system. |
| Printable | Causes the displayed information in the main frame 78 to be printed by printer 22. |

At block 110, the user may select an item displayed in the control frame 80 as created at block 108. If the user points and clicks at the "Printable" button in control frame 80, then the software 10 completes the instruction to print at block 112 by selecting the data set from the offender from the stored database at block 114 and forwarding the selected placement for printing on printer 22 at block 116.

If the "Printable" button is not chosen, but the "Summary" button is selected by mouse clicking, the software 10 instructs the data processing system at block 118 to retrieve the linked information from the database at block 120 and causes it to be displayed in main frame 78 at block 122.

The software 10 examines whether one of the buttons for "Summary", "Printable" or "Home" are selected in control frame 80 and if not, then the instruction set of software 10 at block 126 causes the grid of sixteen cells exemplified in FIG. 5 to be displayed at block 124 in the main frame 78 of the display 14.

As with current conventions in browser software applications, links to other information may be shown with blue type face to indicate that selection of that item of information will lead to other relevant information.

Block 130 identifies the temporary end of use of the subroutines in blocks 100 et seq. and the return to the client management system at blocks 30–54 of FIG. 2A.

Figure 7:
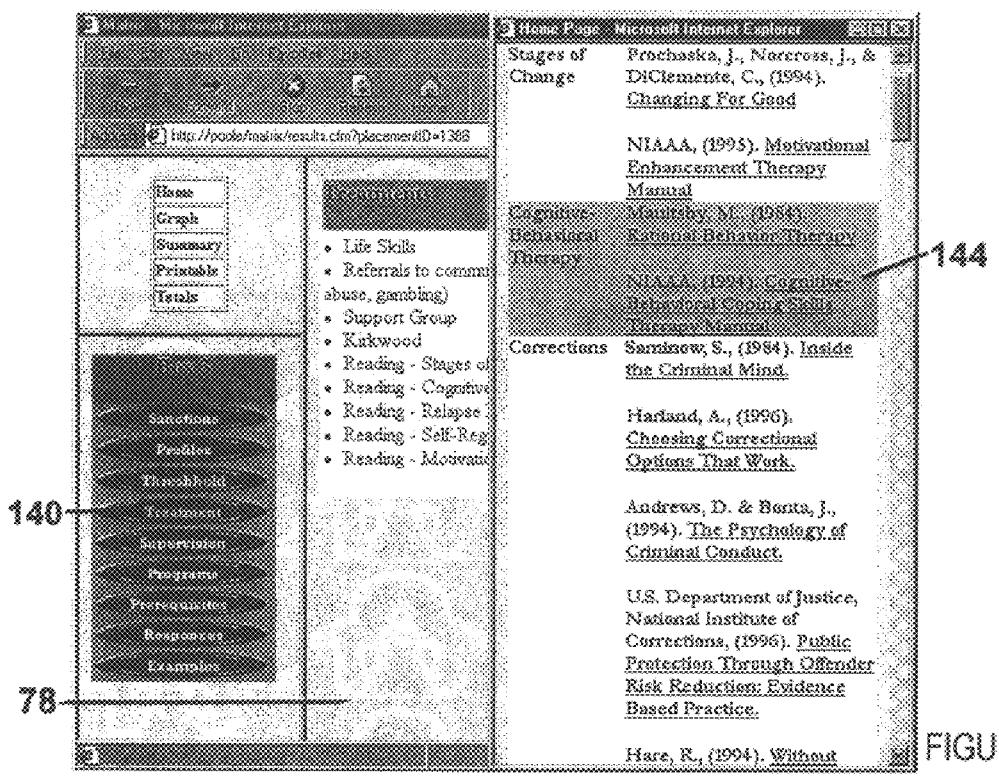
FIG. 7 is a sample display of results and information displayed when the topic "Treatment" is selected related to a selected cell of the cell grid shown in FIG. 5. An overlying window lists readings which have been retrieved when a linked item in the information list has been selected.

When a list of context-sensitive related information has been called up by selection of one of radio buttons 140, for example "Treatments", then the list of information displayed in main frame 78 may include items which link to a bibliography of references for supplementary reading which are displayed in an overlying frame 144, as illustrated in FIG. 7.

Figure 8:
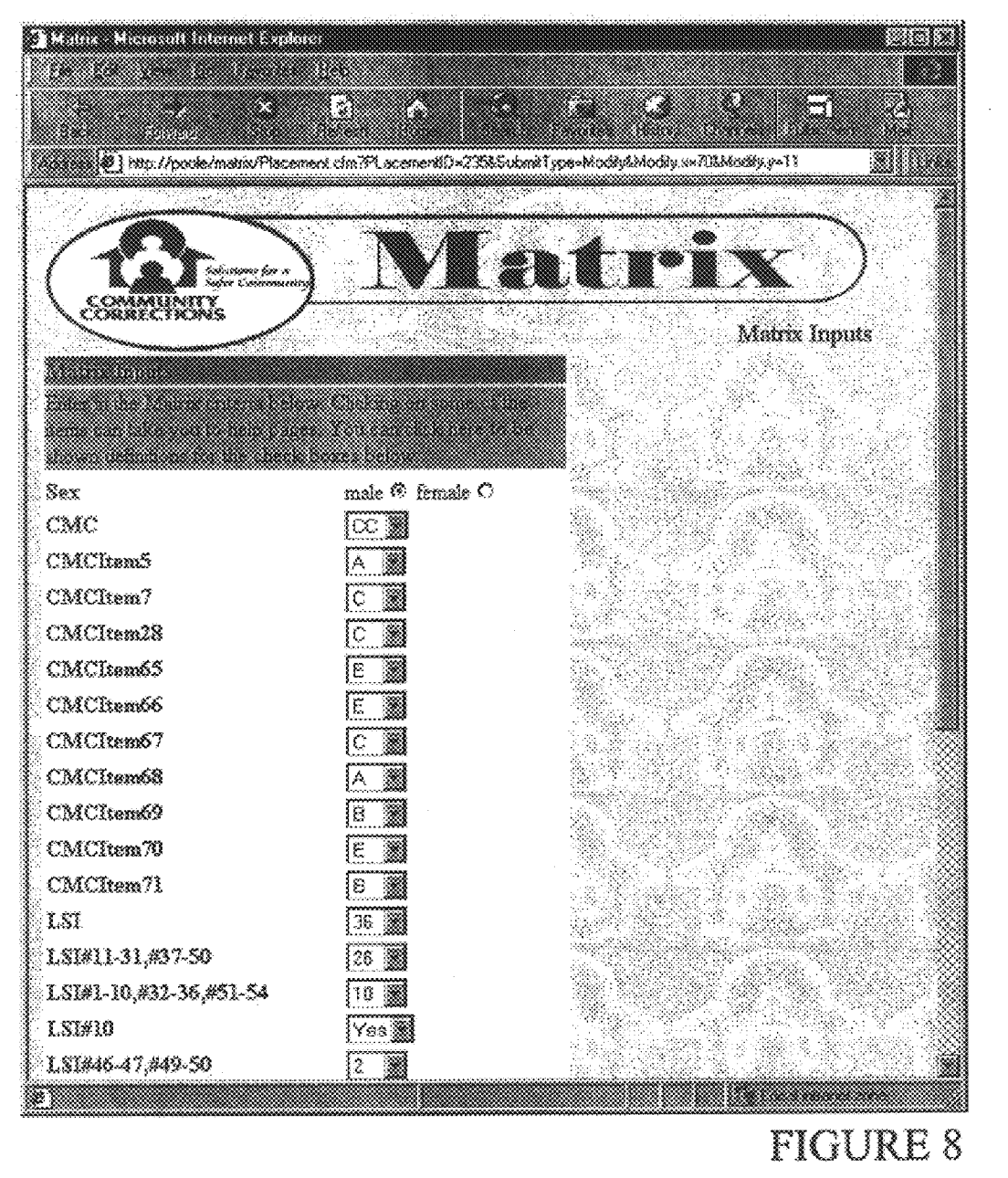

FIG. 8 is a sample display of the particular set of assessment tool factors which have been entered in the data processing system related to the subject offender whose placement is being reviewed. This data may be examined at the user's selection at block 70 of FIG. 2A.

Figure 9:
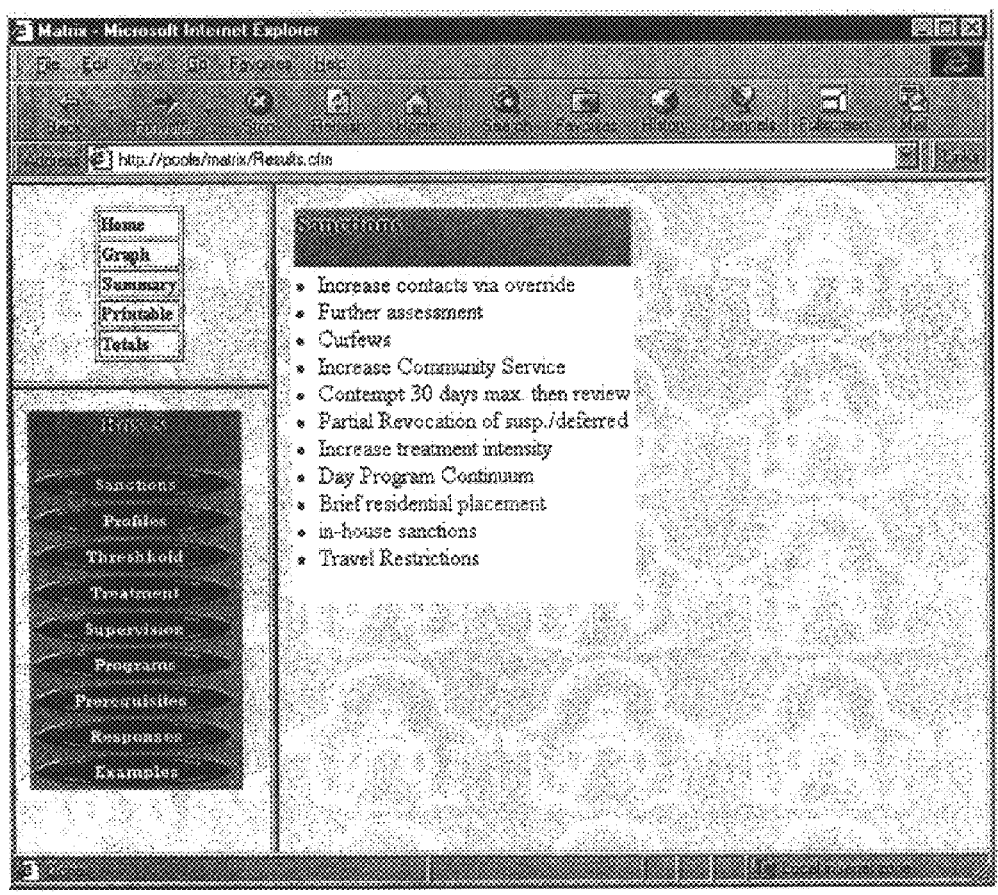
FIG. 9 is a sample display of the data processing system of the invention when the topic "Sanctions" has been selected by selecting that term in the frame of the display identified as "Box 3"

FIG. 9 is a sample display of the data processing system of the invention when the topic "Sanctions" has been selected by selecting that term in the frame of the display identified as "Box 3". This list of "Sanctions" corresponds to treatment and control levels appropriate for an offender categorized in cell 3 of the display of FIG. 5. The selection of this display would be made at block 134 of FIG. 2C.

Figure 10:
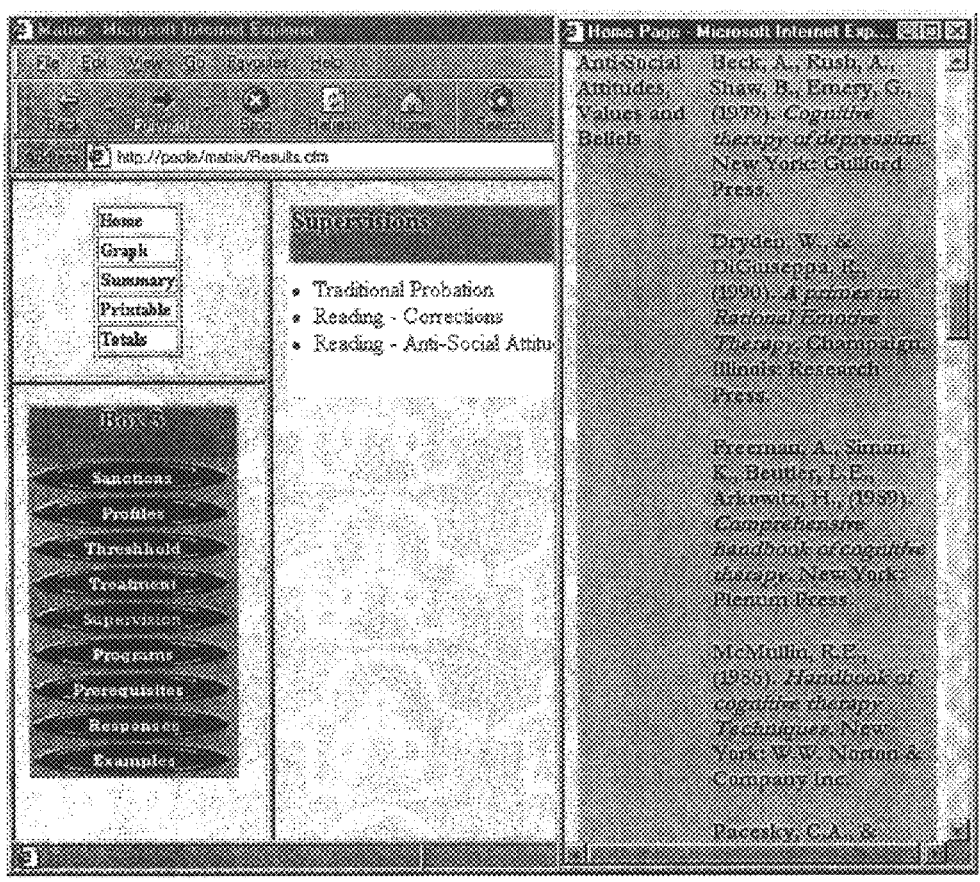
FIG. 10 is a sample display generated by the data processing system when the topic "Supervision" has been selected by selecting that term in the frame of the display identified as "Box 9"

FIG. 10 is a sample display of the data processing system when the topic "Supervision" has been selected by selecting that term in the frame of the display identified as "Box 9". This list of "Supervision" corresponds to appropriate activity in dealing with an offender categorized as needing elevated control and elevated treatment as indicated in cell 9 of FIG. 5. The overlying window lists a bibliography of related readings related to the topic "Supervision" and is linked to the item "Reading—Anti-Social Attitudes, Values, and Beliefs" in the list in the overlain frame headed by "Supervisions".

Figure 11:
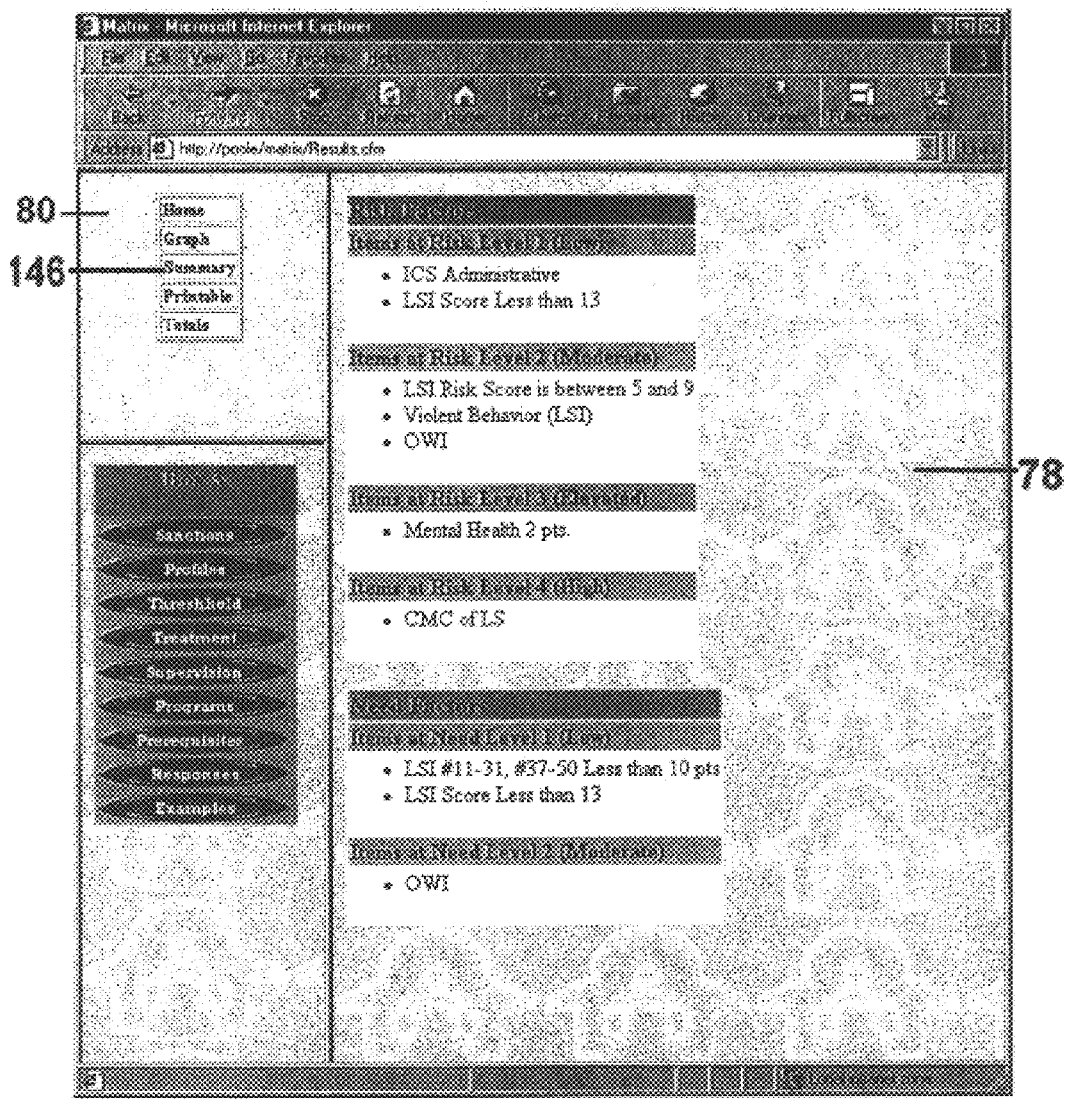
FIG. 11 is an exemplary display of summary information provided by the data processing system when the user selects "Summary" in the upper left frame of the window displayed on the screen.

FIG. 11 illustrates a screen display which is provided by the data processing system when the user selects "Summary" from one of control buttons 146 in control frame 80. Choosing the control button 146 marked "Summary" causes listing in main frame 78 of the definitional standards reflected in the four category levels of risk (control) and the four levels of need (treatment). Printed copies of the displayed information are generated when control button 146 marked "Printable" of control frame 80 is selected with the computer's mouse. Selection of "Home" causes the data processing system to return the user to the "Client Entry" stage as illustrated in FIG. 4. A graph may be generated when control button 146 marked "Graph" is selected and similarly, totals are displayed when control button 146 for "Total" is selected.

The invention system is based on internet and intranet technologies, linking the user quickly to selective parts of the data outputs as randomly selected by the user. The preferred embodiment employs the following application and system software: Microsoft® Internet Explorer web browser, Microsoft® SQL Server™ database engine, Allaire™ ColdFusion™ web application server software, Microsoft® IIS™ internet information server, and Microsoft® Windows NT™ network operating system software.

The data processing system may be used by remote users with access to connections to the data processing system by network means. A remote user equipped with a device for internet browsing such as a personal computer or other terminal equipped with web browser software such as Microsoft® Internet Explorer may enter an HTTP request to the internet information server software of the data processing system via the network, whether the connection be to the internet or to a local area network (intranet). The internet information server passes the inquiry to The Matrix™ software which causes the application server (Allaire™ ColdFusion™ software) to acquire the desired data sought from the storage medium 16 of the data processing system by use of the incorporated database management software. The web application server software generates a web page which displays the data retrieved from the storage medium 16. The web page is reproduced at the user's personal computer or terminal such that the information contained in the web page may be reviewed and data may be entered or modified by the user by initiating an HTTP request through the internet or intranet to the web server (internet information server) to the web application software used with the web application server software, leading to additions or modifications of the data on storage media 16.

It is to be understood that variations in the types and suppliers of software may be employed to achieve the resulting system which is claimed. All such variations, as well as those which may be feasible based on new generations of system software, are contemplated by this disclosure.

Having described the invention, I claim:

1. A data processing system for recommending a strategy for supervision of an offender comprising computer processing means for processing data, storage means for storing data on a storage medium, input means for entering assessment factors of the offender, synthesizing means for deriving for said offender a control score and a treatment score from selected ones of said factors, display means for displaying the control score and the treatment score derived for said individual offender, said display means selectively displays available sanctions appropriate for control of said offender.

2. The data processing system of claim 1, wherein said display means displays of a grid of cells, each cell indicative of a combination of possible control scores and possible treatment scores, highlighting means for identifying one of said cells of said grid corresponding to the control score and the treatment score derived for said individual offender.

3. The data processing system of claim 1, wherein said display means selectively displays supervision options available for use with said offender.

4. The data processing system of claim 1, wherein said display selectively displays said assessment factors of said offender.

5. The data processing system of claim 1, wherein said display menads selectively displays available treatment options appropriate for use with said offender.

6. The data processing system of claim 1, wherein said display selectively displays information corresponding to said offender upon selection of a labeled space displayed on said display means.

7. A method for developing a supervision plan for an offender of a group of supervised offenders comprising entering selected assessment factors concerning one or more of said group of supervised offenders into a database in a computer, calculating a risk score from the selected factors of said offender, calculating a need score from said selected factors of said offender, displaying on a display coupled to said computer said risk score and said need score of said offender, selectively displaying on the display available sanctions appropriate for control of said offender.

8. The method of claim 7 further comprising the steps of displaying a grid of cells representing combinations of need scores and risk scores, marking on the display a selected cell of said grid of cells corresponding to said risk score and said need score of said one of said group of supervised offenders.

9. The of claim 7 further comprising the steps of sorting said database to arrange said factors into sets corresponding to each of said group of supervised offenders, displaying on said display the set of factors corresponding to one said group of supervised offenders.

10. The method of claim 7 further comprising the steps of displaying an explanation of said factors resulting in said risk score.

11. The method of claim 7 further comprising the steps of displaying an explanation of said factors resulting in said need score.

12. A data processing system for determining a strategy for supervision of an offender comprising a computer provided with a network operating system and a storage medium, the computer provided with relational database management hardware, said computer provided with internet information server software, said computer provided with integration software for integrating data managed in said database management software with said web browser software and with said internet information server software, said database management software receiving demographic data regarding said offender, said database management software receiving assessment data corresponding with said offender, said integration software deriving a risk score and a need score from said demographic data and said assessment data, a display coupled to said computer, said display receiving said risk score and said need score and displaying said scores visually, said display displaying a sixteen cell grid illustrating combinations of possible risk scores and possible need scores, said risk score and said need score indicated within a one of the sixteen cells of said grid, said display highlighting said one of said sixteen cells.

13. The data processing system of claim 12 wherein said computer is selectively operable to cause display of said demographic data regarding said offender.

14. The data processing system of claim 12 wherein said computer is selectively operable to cause display of said assessment data regarding said offender.

15. The data processing system of claim 12 wherein said storage medium has stored thereon a collection of correctional steps available for supervision of said offender, said data management software relating said correctional steps with said risk score and said need score, said computer selectively operable to cause display of said correctional steps related to said risk score and said need score of said offender.

16. The data processing system of claim 12 wherein said storage medium has stored thereon a collection of profile information regarding persons having risk scores within a range and need scores within a range, said computer selectively operable to display selected profile information of a person whose risk score and need score correspond to said risk score and said need score of said offender.

17. The data processing system of claim 12 wherein said storage medium has stored thereon supervision options available for use with said offender, said database management system causes said supervision options to be related to particular ranges of risk scores and need scores, said computer selectively operable to cause display of an array of supervision options related to said risk score and said need score of said offender.

18. The data processing system of claim 12 wherein said computer causes said display to divide into multiple visually observable frames, a first set of data displayed in one of said multiple frames, a second set of data selectively displayed concurrently in a second of said multiple frames, a third set of selectable data displayed concurrently in a third of said multiple frames.

19. The data processing system of claim 18 wherein selection of a first item of said first set of data causes selective display of related data in said second frame.

* * * * *